United States Patent
Song et al.

(10) Patent No.: US 8,360,820 B2
(45) Date of Patent: Jan. 29, 2013

(54) ROBOTIC MANIPULATOR

(75) Inventors: Shang-Xuan Song, Shenzhen (CN); Cheng Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 569 days.

(21) Appl. No.: 12/627,115

(22) Filed: Nov. 30, 2009

(65) Prior Publication Data
US 2011/0052360 A1    Mar. 3, 2011

(30) Foreign Application Priority Data
Sep. 3, 2009 (CN) .......................... 2009 1 0306553

(51) Int. Cl.
*B24B 49/00* (2012.01)
(52) U.S. Cl. ........... 451/11; 451/388; 451/397; 451/402
(58) Field of Classification Search .................... 451/11, 451/379, 388, 397, 398, 402
See application file for complete search history.

(56) References Cited

U.S. PATENT DOCUMENTS

| | | | |
|---|---|---|---|
| 1,390,627 A * | 9/1921 | Lindahl | 269/21 |
| 6,860,790 B2 * | 3/2005 | Dvir | 451/5 |
| 7,118,452 B2 * | 10/2006 | Wood | 451/11 |
| 7,153,184 B2 * | 12/2006 | Kuebler et al. | 451/5 |
| 2002/0173226 A1 * | 11/2002 | Carlson, III | 451/5 |
| 2003/0092358 A1 * | 5/2003 | McNurlin et al. | 451/5 |
| 2006/0009126 A1 * | 1/2006 | Kuebler et al. | 451/5 |
| 2006/0035563 A1 * | 2/2006 | Kalenian et al. | 451/5 |

* cited by examiner

*Primary Examiner* — Maurina Rachuba
(74) *Attorney, Agent, or Firm* — Altis Law Group, Inc.

(57) ABSTRACT

A robotic manipulator for clamping a workpiece includes a power source, a first rotary member, and a clamping mechanism. The first rotary member is connected to and rotated by the power source. The clamping mechanism is non-rotatably connected to the first rotary member and includes a first clamping member and a second clamping member capable of coupling to and decoupling from the first clamping member. The first clamping member and the second clamping member are coupled to each other. A receptacle is defined between the first clamping member and the second clamping member to receive the workpiece. The receptacle has a shape and size substantially the same as the workpiece.

14 Claims, 5 Drawing Sheets

ROBOTIC MANIPULATOR

BACKGROUND

1. Technical Field

The present disclosure generally relates to robotics, and particularly, to a robotic manipulator used in manufacturing.

2. Description of Related Art

Robotic manipulators are used extensively in manufacturing. When a plurality of regions of a workpiece is required during machining, the workpiece is often held by a rotatable robotic manipulator. The different regions can be machined due to rotation of the robotic manipulator making the different regions facing a machining tool at different time.

A robotic manipulator often includes a power mechanism, a rotary head connected to the power mechanism, a rotary shaft, a rotary wheel fixed to the rotary shaft, and a clamp mounted on the rotary shaft. A workpiece is acquired by the clamp. The power mechanism drives the rotary head, the rotary shaft, and the rotary wheel to rotate, thus different regions of the workpiece can be machined. However, the robotic manipulator is not suited for workpieces that are easily deformed, such as frames or housings.

Therefore, a robotic manipulator is desired to overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
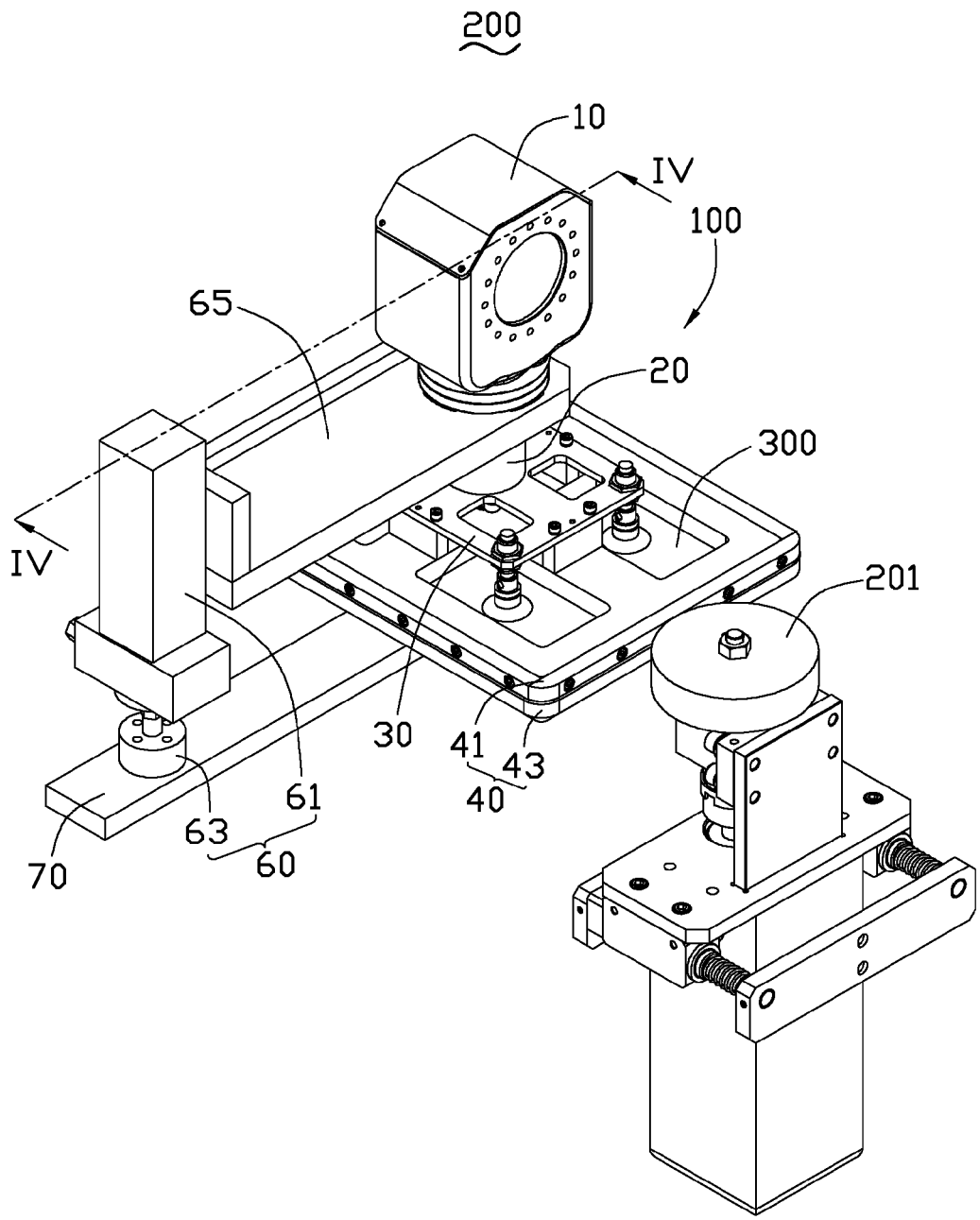
FIG. 1 is an isometric view of one embodiment of a robotic manipulator positioning a workpiece, the robotic manipulator including a power source, a first rotary member, an absorbing mechanism, a clamping mechanism, a resisting member, a driving mechanism, a second rotary member, a connecting unit, and a positioning unit.
Figure 2:
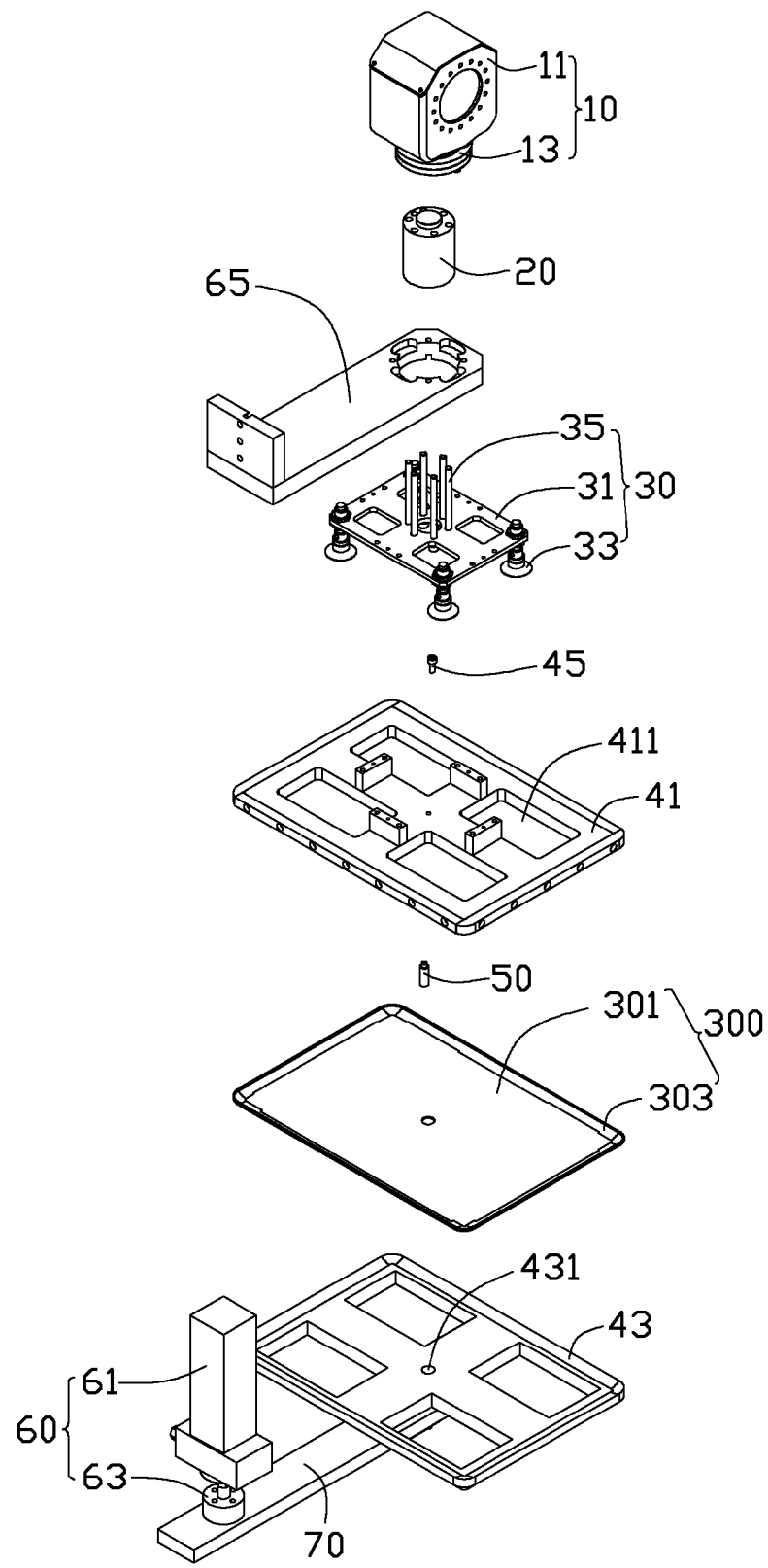
FIG. 2 is an isometric, exploded view of the robotic manipulator of FIG. 1.
Figure 3:
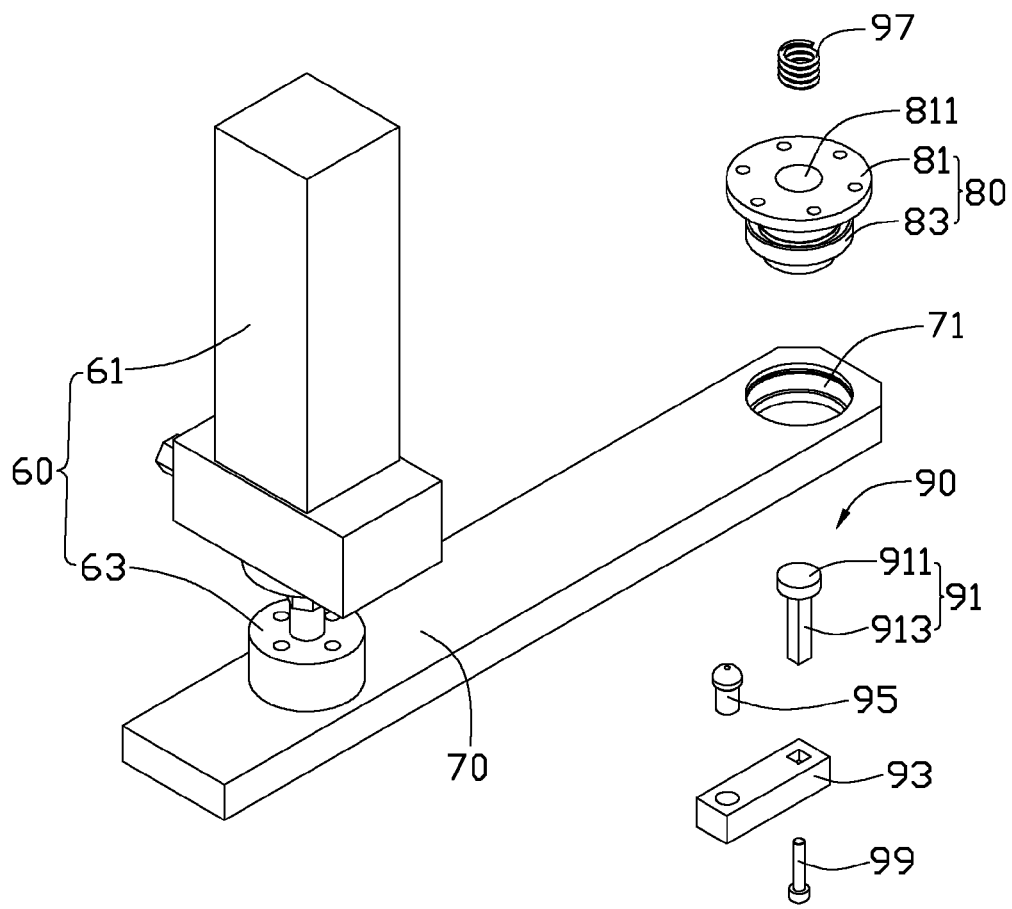
FIG. 3 is an isometric, exploded view of the driving mechanism, the connecting unit, and the positioning unit of the robotic manipulator of FIG. 1.

Referring to FIG. 1 through FIG. 3, an embodiment of a robotic manipulator 100 is shown applied in a grinding apparatus 200 to machine a workpiece 300. Alternatively, the robotic manipulator 100 may be applied in other machines such as milling machines and lathes. The robotic manipulator 100 includes a power source 10, a first rotary member 20, an absorbing mechanism 30, a clamping mechanism 40, a resisting member 50, a driving mechanism 60, a second rotary member 70, a connecting unit 80, and a positioning unit 90. The absorbing mechanism 30 and the clamping mechanism 40 are fixed to the first rotary member 20. The resisting member 50 is fixed to the absorbing mechanism 30. The driving mechanism 60 is fixed to the power source 10. The second rotary member 70 is fixed to the driving mechanism 60.

The power source 10 includes a main body 11 and an adjoining portion 13. The first rotary member 20 is fixed to the adjoining portion 13 of the power source 10 and rotated by the power source 10.

The absorbing mechanism 30 includes a support plate 31, a plurality of cupules 33 mounted on the support plate 31, and a plurality of connecting poles 35 mounted at a middle portion of the support plate 31. The cupules 33 and the connecting poles 35 protrude in opposite directions. The absorbing mechanism 30 is fixed to the first rotary member 20 by the connecting poles 35 in the first rotary member 20. The number of the cupules 33 is determined by a size of the workpiece 300, for example one, two, or more. Generally, larger workpieces require more cupules 33.

The clamping mechanism 40 includes a first clamping member 41 and a second clamping member 43 to couple to the first clamping member 41. The first clamping member 41 is fixed to the support plate 31 of the absorbing mechanism 30 via a fastener 45, such as, for example, a screw. The first clamping member 41 defines a plurality of through slots 411 corresponding to the cupules 33. The second clamping member 43 defines a through hole 431. When the first and the second clamping member 41, 43 are coupled to each other, a receptacle 47 is defined to receive the workpiece 300. As such, the workpiece 300 is secured. The receptacle 47 has a shape substantially the same as the workpiece 300.

The resisting member 50 is fixed to the support plate 31 via the fastener 45. The resisting member 50 is partially received in the first clamping member 41 and protrudes through the first clamping member 41, the workpiece 300, and the second clamping member 43.

The driving member 60 may be an air cylinder including a fixed portion 61 and a movable portion 63. The movable portion 63 can slide along and rotate around an axis of the driving member 60 relative to the fixed portion 61. The driving mechanism 60 is connected to the adjoining portion 13 of the power source 10 via a connecting plate 65. One end of the second rotary member 70 is fixed to the movable portion 63, and an opposite end of the second rotary member 70 defines a mounting hole 71.

Figure 4:
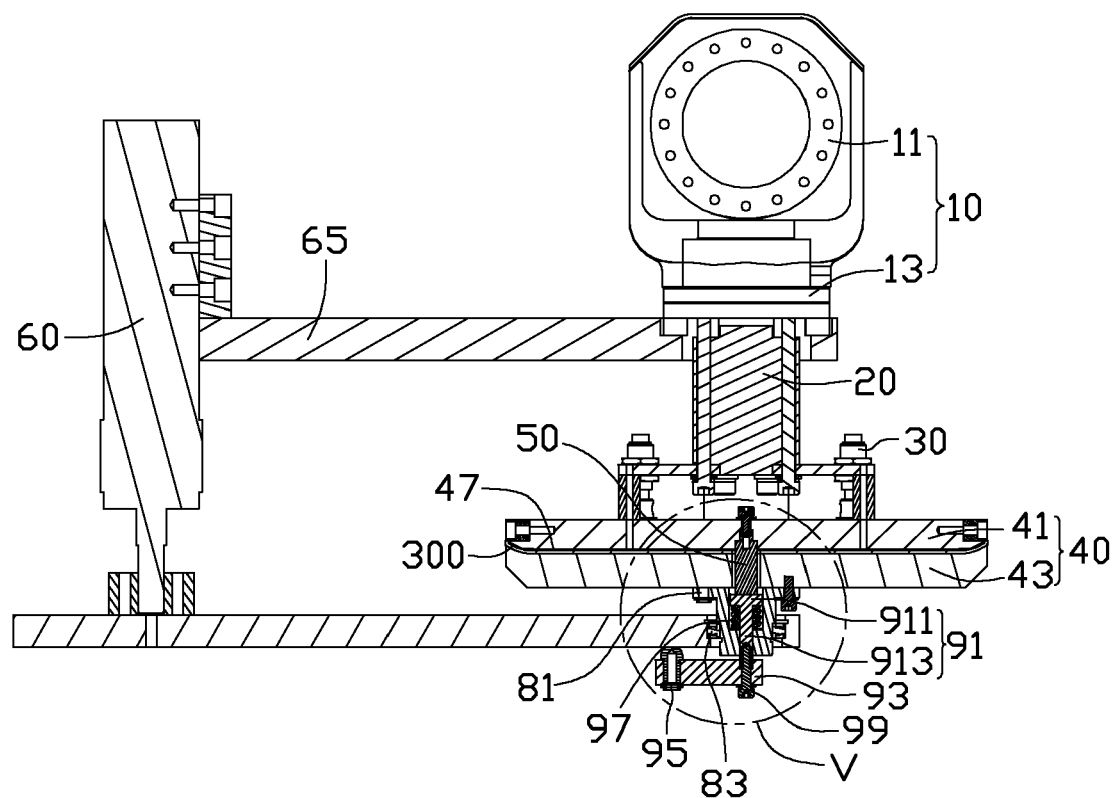
FIG. 4 is a cross-section of the robotic manipulator taken along line IV-IV of FIG. 1.
Figure 5:
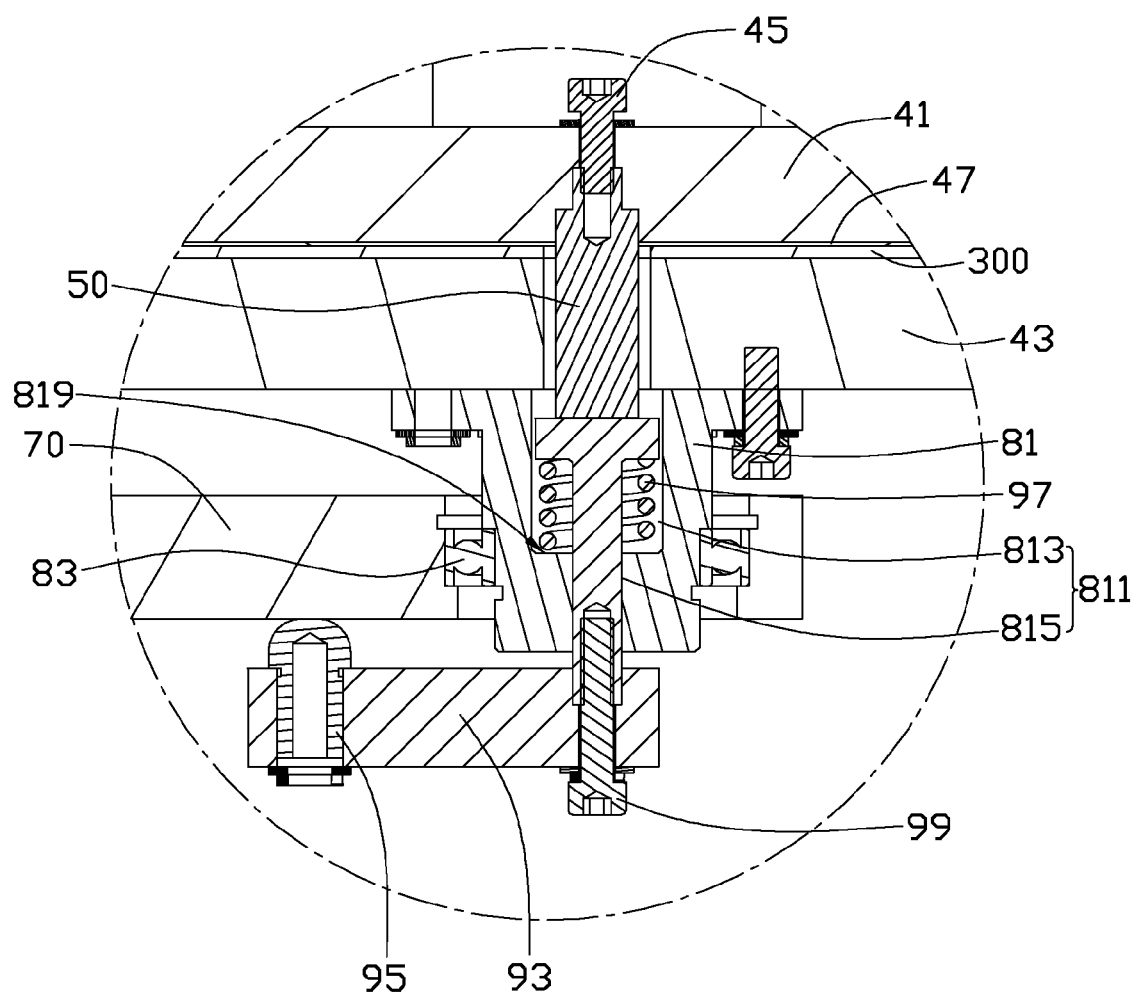
FIG. 5 is an enlarged view of a region V of FIG. 4.

Referring to FIG. 3 through FIG. 5, the connecting unit 80 includes a shaft 81 and a bearing 83. The shaft 81 defines a receiving channel 811 including a first assembly hole 813 and a second assembly hole 815 with a diameter smaller than the first assembly hole 813. A joining portion of the first assembly hole 813 and the second assembly hole 815 defines a step 819. The shaft 81 is fixed to the second clamping member 43, and the bearing 83 is rotatably received in the mounting hole 71 of the second rotary member 70. Thereby, the second clamping member 43 is rotatable relative to the second rotary member 70.

The positioning unit 90 includes a positioning post 91, a positioning board 93, a pin 95, an elastic member 97, and a fastening member 99. In the illustrated embodiment, the fastening member 99 is a bolt. The positioning post 91 includes a cap 911 and a shaft portion 913. The cap 911 and part of the shaft portion 913 are received in the first assembly hole 813 of the connecting unit 80, and the positioning post 91 is slidable in the first assembly hole 813. The elastic member 97 resists between the cap 911 and the step 819. An end of the shaft portion 913 extends out of the second assembly hole 815 and engages with the fastening member 99 to fix the positioning board 93. A cross-section of the shaft portion 913 and a shape of the second assembly hole 815 can be rectangular, such that the shaft portion 913 is non-rotatable relative to the shaft 81. The pin 95 is fixed on the positioning board 93 and resists the second rotary member 70. When the elastic member 97 is in a free state or slightly compressed, the pin 95 resists the second rotary member 70 to prevent the positioning unit 90 from moving relative to the second rotary member 70, thus positioning the positioning unit 90.

The workpiece 300 may be a housing or a frame prone to deformation. In the illustrated embodiment, the workpiece 300 is a housing including a bottom wall 301 and a sidewall 303 substantially perpendicular to the bottom wall 301.

Referring to FIG. 1 through FIG. 4, the grinding machine 200 includes the robotic manipulator 100 and a grinding wheel 201. When grinding the workpiece 300, the driving mechanism 60 moves the movable portion 63 along a straight line and rotates, thus the second clamping member 43 moves away from the first clamping member 41 and rotates. The cupules 33 of the absorbing mechanism 30 cradle the workpiece 300, and the resisting member 50 runs through the workpiece 300. The driving mechanism 60 drives the movable portion 63 to move and rotate again, such that the first clamping member 41 couples to the second clamping member 43 to fix the workpiece 300 therebetween. An edge of the workpiece 300 is substantially coplanar to edges of the first clamping member 41 and the second clamping member 43. The sidewall 303 of the workpiece 300 faces the grinding wheel 201 to await machining.

When the workpiece 300 is held by the clamping mechanism 40, the resisting member 50 runs through the through hole 431 of the second clamping member 43, enters the receiving channel 811 of the connecting unit 80, and resists the cap 911 of the positioning post 91. The elastic member 97 is compressed. The positioning post 91 moves away from the second clamping member 43, and the pin 95 moves away from the second rotary member 70. The rotating grinding wheel 201 machines the workpiece 300. After finishing one portion of the workpiece 300, the power source 10 rotates the first rotary member 20, the clamping mechanism 40 and the workpiece 300 into another position such that another portion of the workpiece 300 may be machined. When the workpiece 300 is removed from the clamping mechanism 40, the elastic member 97 moves the positioning post 91, the pin 95 towards the second clamping member 43, so that the pin 95 resists the second rotary member 70 again.

The first clamping member 41 and the second clamping member 43 hold the workpiece 300 from opposite directions, balancing forces from the first clamping member 41 and the second clamping member 43, and the entire workpiece 300 is received in the receptacle 47. Thus, deformation of the workpiece 300 is avoided. In addition, the connecting unit 80 and the positioning member 90 impel the pin 95 to resist or separate from the second rotary member 70, thus the second clamping member 43 is fixed or movable relative to the second rotary member 70. When the first clamping member 41 and the second clamping member 43 separate, the second clamping member 43 is non-rotatable relative to the second rotary member 70. Therefore, the second clamping member 43 remains aligned with the first clamping member 41, making it easy to re-couple the second clamping member 43 to the first clamping member 41.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A robotic manipulator for clamping a workpiece, the robotic manipulator comprising:
  a power source;
  a first rotary member connected to and rotated by the power source;
  a clamping mechanism non-rotatably connected to the first rotary member and including a first clamping member and a second clamping member capable of coupling to and decoupling from the first clamping member, wherein when the first clamping member and the second clamping member are coupled to each other, a receptacle is defined between the first clamping member and the second clamping member to receive the workpiece, the receptacle having a shape and size substantially the same as the workpiece; and the robotic manipulator further comprises an absorbing mechanism fixing to the first rotary member and passing through the first clamping member, the absorbing mechanism comprises at least on cupule; the first clamping member defines at least one slot corresponding to the at least one cupule and allowing the at least one cupule passing therethrough.

2. The robotic manipulator of claim 1, further comprising a driving mechanism and a second rotary member rotatably connected to the second clamping member; the driving member moves the second rotary member along and rotating around a straight axis to decouple the second rotary member from the first clamping member.

3. The robotic manipulator of claim 2, further comprising a connecting unit and a positioning unit, the connecting unit comprising a shaft fixed to the second clamping member and a bearing rotatably connected to the second rotary member.

4. The robotic manipulator of claim 3, wherein the shaft defines a receiving channel including a first assembly hole and a second assembly hole with a diameter less than the first assembly hole; a joining portion of the first assembly hole and the second assembly hole defines a step.

5. The robotic manipulator of claim 4, wherein the positioning unit comprises a positioning post, a positioning board, a pin, an elastic member, and a fastening member, the positioning post comprising a cap and a shaft portion; the cap and a part of the shaft portion is received in the first assembly hole of the connecting unit; the elastic member resists between the cap and the step; an end of the shaft portion extends out of the second assembly hole and engages with the fastening member to fix the positioning board; the shaft portion is non-rotatable relative to the shaft; the pin is fixed on the positioning board and resists the second rotary member.

6. The robotic manipulator of claim 5, further comprising a resisting member connected to the first clamping member, passing through the second clamping member, and resisting the positioning post.

7. robotic manipulator for clamping a workpiece, the robotic manipulator comprising:
  a rotatable clamping mechanism including a first part and a second part capable of coupling to and decoupling from the first part, wherein when the workpiece is held by the clamping mechanism, the first part and the second part are coupled to each other, the workpiece is positioned between the first part and the second part, and an edge of the workpiece substantially is coplanar to the first part and the second part; and the robotic manipulator further comprises an absorbing mechanism fixing to the first rotary member and passing through the first part, the absorbing mechanism comprising at least one cupule; the first part defines at least one slot corresponding to the at least one cupule and allows the at least one cupule passing therethrough.

8. The robotic manipulator of claim 7, further comprising a power source and a first rotary member connected to and rotated by the power source; the clamping member is connected to and rotated by the first rotary member.

9. The robotic manipulator of claim 8, further comprising a driving mechanism and a second rotary member rotatably connected to the second part; the driving member moves the second rotary member along and rotates around a straight axis to decouple the second rotary member from the first part.

10. The robotic manipulator of claim 9, further comprising a connecting unit and a positioning unit; the connecting unit comprising a shaft fixed to the second part and a bearing rotatably connected to the second rotary member.

11. The robotic manipulator of claim 10, wherein the shaft defines a receiving channel including a first assembly hole and a second assembly hole with a diameter less than the first assembly hole; a joining portion of the first assembly hole and the second assembly hole defines a step.

12. The robotic manipulator of claim 11, wherein the positioning unit comprises a positioning post comprising a cap and a shaft portion, a positioning board, a pin, an elastic member, and a fastening member; the cap and a part of the shaft portion are received in the first assembly hole of the connecting unit; the elastic member resists between the cap and the step; an end of the shaft portion extends out of the second assembly hole and engages with the fastening member to fix the positioning board; the shaft portion is non-rotatable relative to the shaft; the pin is fixed on the positioning board and resists the second rotary member.

13. The robotic manipulator of claim 12, further comprising a resisting member connected to the first part, passing through the second part, and resisting the positioning post.

14. A robotic manipulator for clamping a workpiece, the robotic manipulator comprising:
a power source;
a first rotary member connected to and rotated by the power source;
a clamping mechanism non-rotatably connected to the first rotary member and including a first clamping member and a second clamping member capable of coupling to and decoupling from the first clamping member;
a driving mechanism and a second rotary member rotatably connected to the second clamping member; the driving member moving the second rotary member along and rotating around a straight axis to decouple the second rotary member from the first clamping member; and
a connecting unit and a positioning unit, the connecting unit comprising a shaft fixed to the second clamping member and a bearing rotatably connected to the second rotary member; the shaft defining a receiving channel including a first assembly hole and a second assembly hole with a diameter less than the first assembly hole; a joining portion of the first assembly hole and the second assembly hole defining a step,
wherein when the first clamping member and the second clamping member are coupled to each other, a receptacle is defined between the first clamping member and the second clamping member to receive the workpiece, the receptacle having a shape and size substantially the same as the workpiece.

* * * * *